(12) United States Patent
Vican et al.

(10) Patent No.: US 10,668,861 B2
(45) Date of Patent: Jun. 2, 2020

(54) SLIDING CONSOLE ASSEMBLY FOR USE IN A VEHICLE

(71) Applicant: GM Global Technology Operations LLC, Detroit, MI (US)

(72) Inventors: Rudy M. Vican, Oxford, MI (US); Alex Archer, Royal Oak, MI (US); Robert J. Schlenke, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 15/924,843

(22) Filed: Mar. 19, 2018

(65) Prior Publication Data
US 2019/0283680 A1     Sep. 19, 2019

(51) Int. Cl.
*B60R 7/04*     (2006.01)
(52) U.S. Cl.
CPC ..................... *B60R 7/04* (2013.01)
(58) Field of Classification Search
CPC ........................................................ B60R 7/04
USPC ........................................................ 296/24.34
See application file for complete search history.

(56) References Cited

U.S. PATENT DOCUMENTS

| 7,416,235 | B2 * | 8/2008 | Rajappa | B60R 7/04 296/24.34 |
| 9,421,916 | B1 | 8/2016 | Dyle | |
| 2005/0242604 | A1 * | 11/2005 | Bonnes | B60N 2/072 296/35.1 |

* cited by examiner

*Primary Examiner* — Joseph D. Pape
*Assistant Examiner* — Dana D Ivey

(57) ABSTRACT

A floor-mounted console assembly includes a stationary floor bracket having a longitudinal first support bar and a longitudinal second support bar positioned parallel to the first support bar. The console assembly further includes a cradle having a first connector wing and a second connector wing. The first connector wing is slidably received over the first support bar and the second connector wing is slidably received over the second support bar. The console assembly further includes a console connected to the cradle and supported by the first connector wing and the second connector wing such that the console is vertically spaced above the first support bar and the second support bar. The console and the cradle are configured to translate along the first support bar and the second support bar.

20 Claims, 7 Drawing Sheets

SLIDING CONSOLE ASSEMBLY FOR USE IN A VEHICLE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to sliding console assemblies for use in vehicles.

Various types of storage compartments are included in vehicles. One such type of storage compartment is a center console. A center console is often positioned between a driver's seat and a passenger's seat in a vehicle. The center console often opens to permit an occupant to store various items inside the center console. The center console often also serves as an armrest for the driver or other occupant of the vehicle. Center consoles are typically stationary and are secured between the driver's seat and the passenger's seat in the vehicle.

SUMMARY

In one example in accordance with the present disclosure, a floor-mounted console assembly includes a stationary floor bracket configured to secure to a floor of a vehicle. The stationary floor bracket includes a longitudinal first support bar and a longitudinal second support bar positioned parallel to the first support bar. The console assembly further includes a cradle having a first connector wing and a second connector wing. The first connector wing is slidably received over the first support bar and the second connector wing is slidably received over the second support bar. The console assembly further includes a console connected to the cradle and supported by the first connector wing and the second connector wing such that the console is vertically spaced above the first support bar and the second support bar. The console and the cradle are configured to translate along the first support bar and the second support bar from a covered position in which a platform of a floor trim tray is covered by the console to a retracted position in which at least a portion of the platform of the floor trim tray is exposed.

In one aspect, the floor trim tray is connected to the floor bracket wherein the platform of the floor trim tray is vertically positioned between a plane defined by the first and second support bars and the console.

In one aspect, the platform is positioned between a first side wall and a second side wall, and the platform has a smooth, uninterrupted surface between the first side wall and the second side wall.

In one aspect, the cradle includes a base and a tower, and the base is orthogonally connected to the tower to form an L-shape to support the console.

In one aspect, the base of the cradle is positioned between the first connector wing and the second connector wing.

In one aspect, the cradle is suspended in a translation plane above a horizontal support wall of the floor bracket by the first connector wing and the second connector wing.

In one aspect, the console translates at least 127 mm when the console moves from the covered position to the retracted position.

In one aspect, the console longitudinally translates a translation distance in the range of 225 mm to 275 mm.

In one aspect, the cradle includes a cross-rod that transversely extends between the first connector wing and the second connector wing and the console is supported by the cross-rod above the first support bar and the second support bar.

In one aspect, the floor trim tray includes a first side wall and a second side wall connected to longitudinal sides of the platform. The first side wall includes a first longitudinal slot and the second side wall includes a second longitudinal slot. The cross-rod extends through the first longitudinal slot and the second longitudinal slot.

In one aspect, the console includes a saddle mount with a curved bridge portion. The curved bridge portion is received on the cross-rod to vertically support the console and limit longitudinal movement of the console relative to the cradle.

In one aspect, the first connector wing includes a first sleeve and a first ear portion. The first sleeve has a hollow cylindrical shape and is co-axially aligned with the first support bar such that the first sleeve slides along an outer surface of the first support bar. The first ear portion is connected transversely outboard of the first sleeve and projects upwards therefrom.

In one aspect, the second connector wing includes a second sleeve and a second ear portion. The second sleeve has a hollow cylindrical shape and is co-axially aligned with the second support bar such that the second sleeve slides along an outer surface of the second support bar. The second ear portion is connected transversely outboard of the second sleeve and projects upwards therefrom. The console is supported above the first support bar and the second support bar by a cross-rod that extends between the first ear portion and the second ear portion.

In one aspect, the first support bar and the second support bar are connected to and vertically spaced above a horizontal support wall of the floor bracket.

In one aspect, the console includes an armrest and a compartment. The armrest is positioned over the compartment in a seated position and the armrest is configured to translate on a track relative to the compartment to an extended position.

In one aspect, the armrest is configured to translate forward of the compartment when the console is in the retracted position.

In one aspect, the armrest includes a return mechanism that includes a first cable and a second cable. The first cable and the second cable are configured to move the armrest to the seated position when the console is moved from the retracted position to the covered position.

In one aspect, the first cable and the second cable are routed along the cradle and through the console to the armrest.

In another example in accordance with the present disclosure, a floor-mounted console assembly includes a floor bracket having a plurality of attachment tabs configured to secure the floor bracket to a floor of a vehicle and a pair of support bars secured to a horizontal support wall of the floor bracket in a longitudinal direction. The pair of support bars is oriented parallel to one another and is spaced above the support wall of the floor bracket. The console assembly also includes a floor trim tray connected to the floor bracket. The floor trim tray includes a horizontal platform positioned above the pair of support bars and a first side wall connected to the horizontal platform and projecting upwards therefrom. The first side wall includes a first longitudinal opening. The floor trim tray also includes a second side wall connected to the horizontal platform and projecting upwards therefrom opposite to the first side wall. The second side wall includes a second longitudinal opening positioned opposite to the first longitudinal opening. The console assembly also includes a cradle having a base, a pair of connector wings and a cross-rod. The pair of connector wings is joined to the base and projects laterally outward therefrom. The pair of connector wings is received over the pair of support bars to position the base below the horizontal platform of the floor trim tray. The cross-rod is secured to the pair of connector wings such that the cross-rod is supported horizontally above the horizontal platform of the floor trim tray and extends between the pair of connector wings through the first longitudinal opening and the second longitudinal opening. The console assembly also includes a console connected to the cradle and supported above the horizontal platform of the floor trim tray by the cross-rod such that the console is configured to translate with the cradle along the support bars from a covered position in which the horizontal platform is covered by the console to a retracted position in which at least a portion of the horizontal platform is exposed.

In one aspect, the console and the cradle horizontally translate at least 127 mm when the console moves from the covered position to the retracted position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
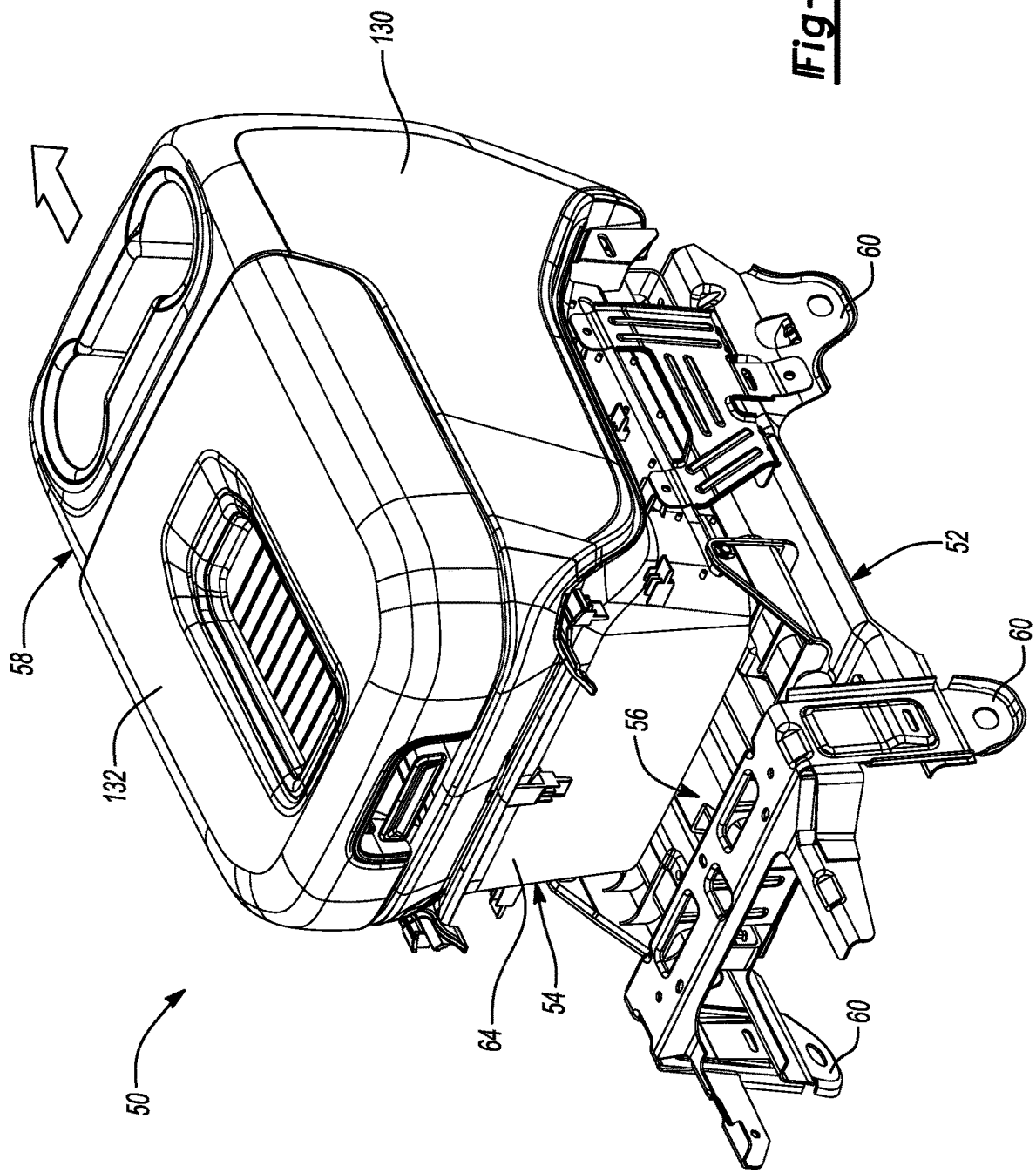
FIG. 1 is a perspective view of an example console assembly in a covered position in accordance with the present disclosure.

In one example in accordance with the present disclosure, a console assembly includes a console that is supported above a floor trim tray in a vehicle. The console slides or translates relative to the floor trim tray from a covered position in which the floor trim tray is covered by the console to a retracted position in which a portion of the floor trim tray is exposed. When the console is in the retracted position, a platform of the floor trim tray is exposed and is accessible to occupants of the vehicle. An occupant can store a personal item such as a purse, briefcase, gym bag, backpack or other item on the platform rather than placing the personal item on the passenger seat or in the passenger-side foot well.

In one example of the console assembly, the console is supported, via a cradle, on a pair of longitudinally positioned support bars. The cradle includes a pair of connector wings that are received over the support bars. The console is mounted to the cradle such that the console and the cradle can translate along the support bars to move the console between the covered position and the retracted position.

The floor trim tray, in such an example, is vertically positioned between the console and the cradle such that the floor trim tray provides an aesthetically pleasing appearance when the console is in the covered position or in the retracted position. The console is supported by a cross-rod that spans transversely across the floor trim tray and is connected to the connector wings of the cradle. In this manner, the console is suspended above the platform without the need for a track, holes or other support structures on or in the platform. Such tracks, holes or other support structures can be fouled by spills, dirt, debris or other contaminants that can inhibit the proper function of a moveable structure. The structure of the console assembly provides a robust, aesthetically pleasing sliding console with an additional storage area when the console retracts.

Referring now to FIGS. 1-11, an example console assembly 50 includes a floor bracket 52, a floor trim tray 54, a cradle 56 and a console 58. The console assembly 50, in the example shown, is configured to be mounted between a driver's and a passenger's seat in a vehicle (not shown). The floor bracket 52 includes one or more attachment tabs 60 that include attachment openings through which suitable fasteners are inserted to secure the console assembly 50 to a floor pan or other structural member of the vehicle. In the example shown, the floor bracket 52 includes a pair of attachment tabs 60 on opposing sides to connect the console assembly 50 to the desired position in the vehicle. As can be appreciated, the console assembly 50 and/or the elements described herein can be used in other applications in addition to the examples provided herein. For example, the console assembly 50 can also be used in aircraft, marine, motorcycle, furniture and other applications.

Figure 2:
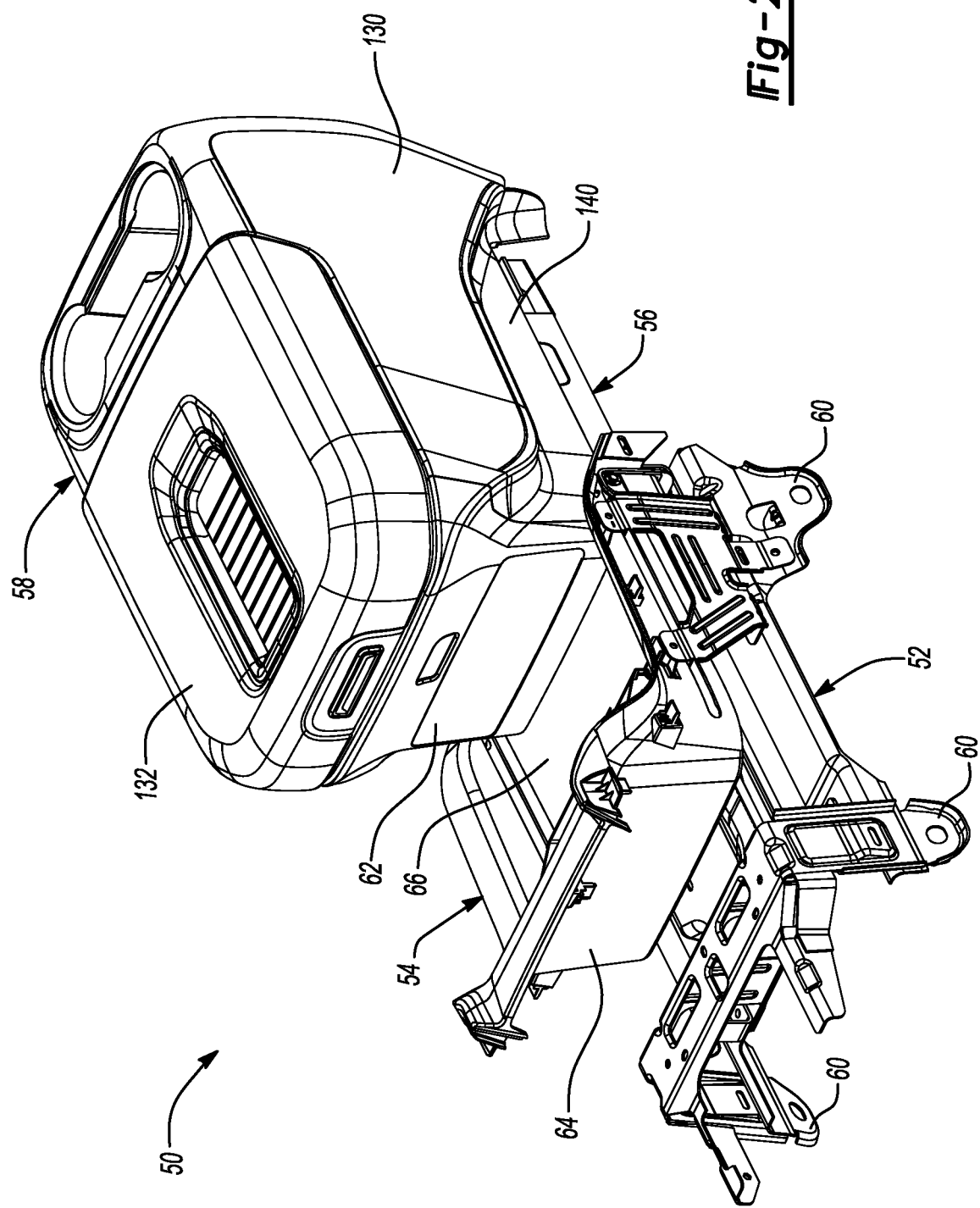
FIG. 2 is a perspective view of the example console assembly of FIG. 1 shown in a retracted position.

As shown in FIGS. 1 and 2, the console assembly 50 is movable from a covered position (FIG. 1) to a retracted position (FIG. 2). In the covered position, the console 58 is positioned such that a face 62 of the console 58 is located adjacent a transverse wall 64 of the floor trim tray 54. In the covered position, the console 58 is positioned over a platform 66 of the floor trim tray 54. The console 58 can move longitudinally (i.e., in a fore-aft direction relative to a vehicle) as indicated by the arrow on FIG. 1. In the retracted position, the console 58 has moved to expose a portion of the platform 66 of the floor trim tray 54. In the retracted position, the face 62 of the console 58 is located further away from the transverse wall 64 of the floor trim tray 54 than when in the covered position. As can be appreciated, the portion of the platform 66 that is exposed when the console 58 is moved to the retracted position can be used by an occupant to store a personal item such as a purse, briefcase, backpack, shopping bag, diaper bag, or the like.

Figure 3:
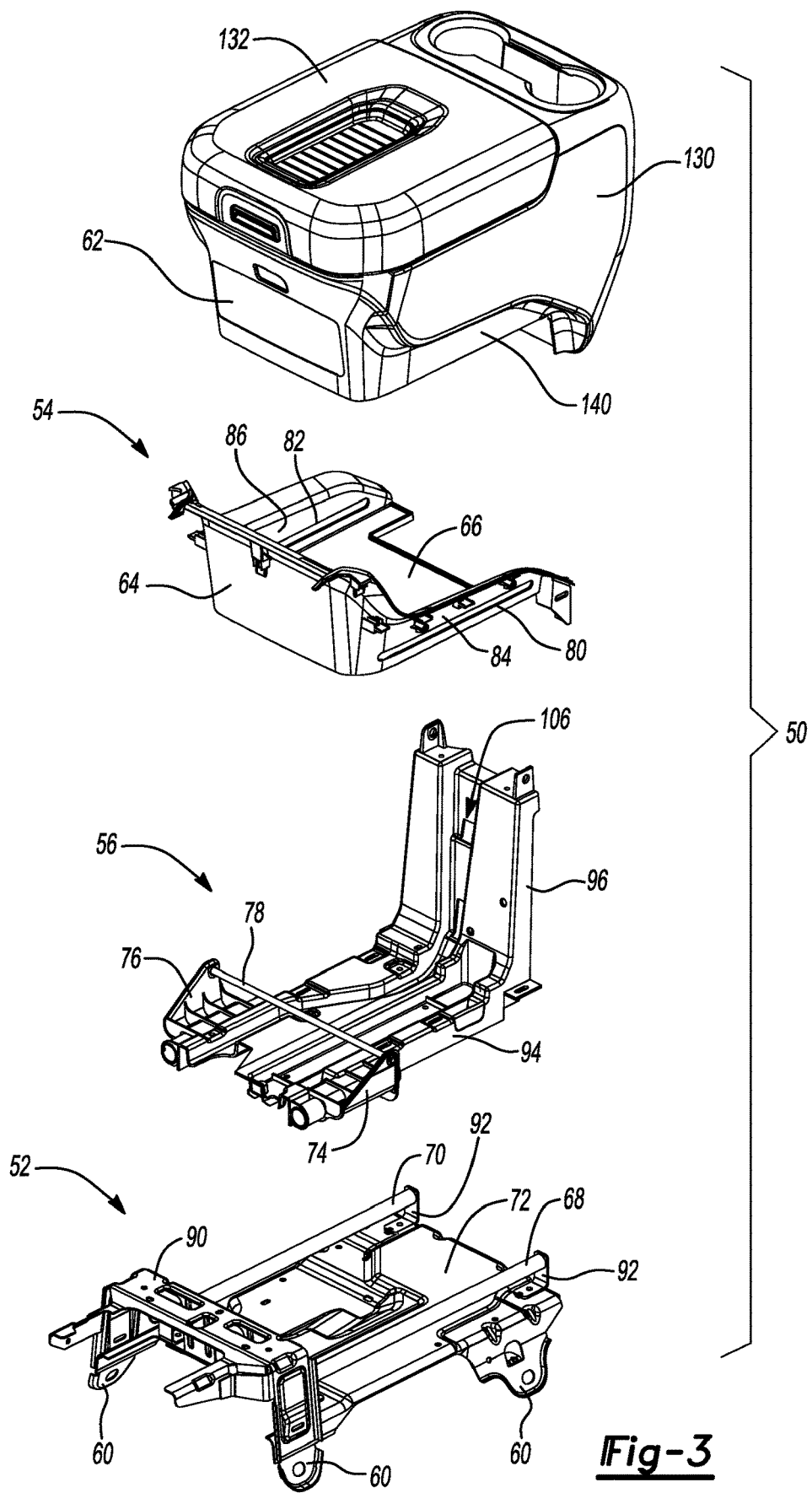
FIG. 3 is an exploded perspective view of the example console assembly of FIG. 1.

Referring now to FIG. 3, the floor bracket 52 is the lower member of the console assembly 50 that, as described above, is used to mount the console assembly 50 in a predetermined location. As shown, the floor bracket 52 includes a first support bar 68 and a second support bar 70 that are positioned above a horizontal support wall 72. The cradle 56 includes a first connector wing 74 and a second connector wing 76 that are received over the first support bar 68 and the second support bar 70, respectively. As such, the cradle 56 can slide along the first support bar 68 and the second support bar 70 to move the console 58 from the covered position to the retracted position.

As further shown in FIGS. 1-3, the floor trim tray 54 is secured to the floor bracket 52 at a vertical position between the first and second support bars 68, 70 and the console 58. The console 58 is supported (at least in part) on a cross-rod 78 that spans transversely across the cradle 56 between the first connector wing 74 and the second connector wing 76. The cross-rod 78 extends through a first longitudinal slot 80 and a second longitudinal slot 82 in the floor trim tray 54. The first longitudinal slot 80 is positioned in a first side wall 84 of the floor trim tray 54 and the second longitudinal slot 82 is positioned in a second side wall 86 opposite to the first side wall 84 in the floor trim tray 54. In this manner, the console 58 has an appearance of "floating" over the floor trim tray 54 and permits the platform 66 of the floor trim tray 54 to have a smooth interrupted surface (as shown in FIG. 2).

Figure 4:
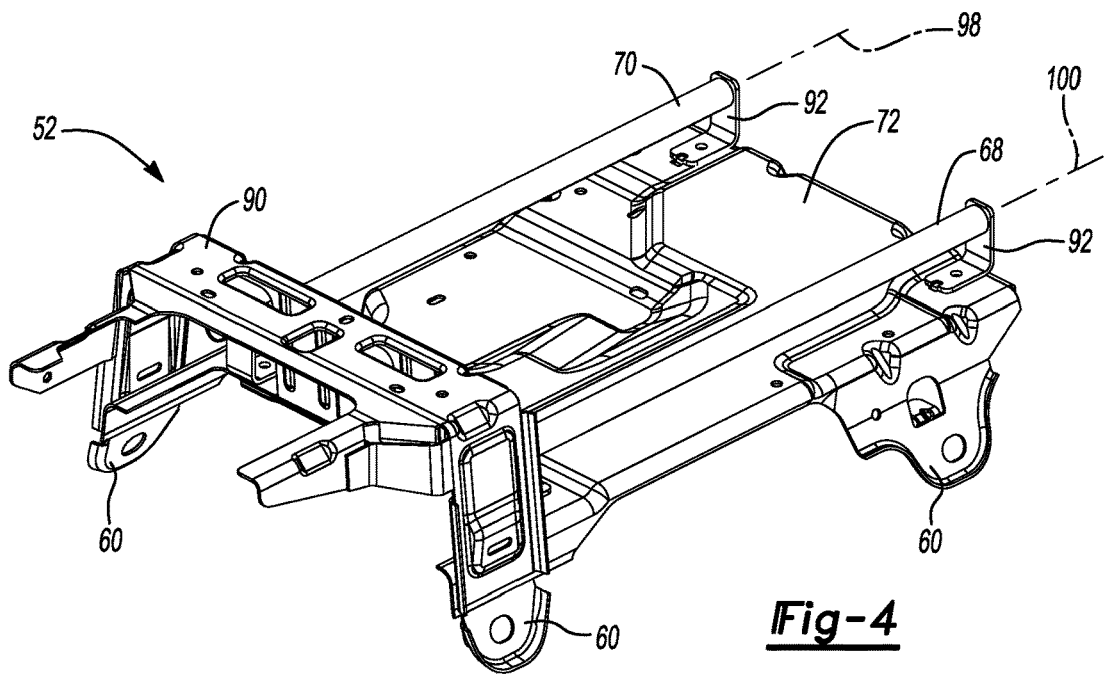
FIG. 4 is perspective view of a floor bracket of the example console assembly of FIG. 1.

Referring now to FIG. 4, the floor bracket 52, as previously described, includes attachment tabs 60 projecting away from the support wall 72. The support wall 72 is a horizontal wall. The floor bracket 52 also includes a brace 90. The brace 90, in the example shown, projects upward from the support wall 72 and can be connected to the instrument panel or other elements on the forward side of the floor bracket 52.

The floor bracket 52 also includes the first support bar 68 and the second support bar 70. The first support bar 68 and the second support bar 70 are oriented longitudinally at or near the lateral sides of the floor bracket 52. In the example shown, the first support bar 68 is an elongated cylindrical member with a center axis 98 and the second support bar 70 is a similar elongated cylindrical member with a center axis 100. The first support bar 68 is positioned parallel to the second support bar 70. The first support bar 68 and the second support bar 70 are connected to the floor bracket 52 by L-shaped mounting brackets 92. The mounting brackets 92, in the example shown, have the same L-shape and are mounted to the support wall 72 at the ends of the first support bar 68 and the second support bar 70. The mounting brackets 92 position the first support bar 68 and the second support bar 70 in a horizontal translation plane (defined by the center axes 98, 100) that is vertically spaced above the support wall 72. This relative positioning of the first support bar 68 and the second support bar 70 above the support wall 72 permits the cradle (and the console 58) to slide (or translate) along the first support bar 68 and the second support bar 70 above the support wall 72. While four L-shaped mounting brackets 92 are used to connect and position the first support bar 68 and the second support bar 70 in the translation plane in this example, other types or shapes of mounting brackets or other elevating structures can be used.

In one example, the floor bracket 52 is made of a suitable steel that is stamped or otherwise formed with the structure previously described. In other examples, the floor bracket 52 can be formed of other suitable materials including suitable metals, alloys, plastics and/or composites. The first and second support bars 68, 70, in the example shown, are made of polished steel rods. In other examples, other materials can be used.

Figure 5:
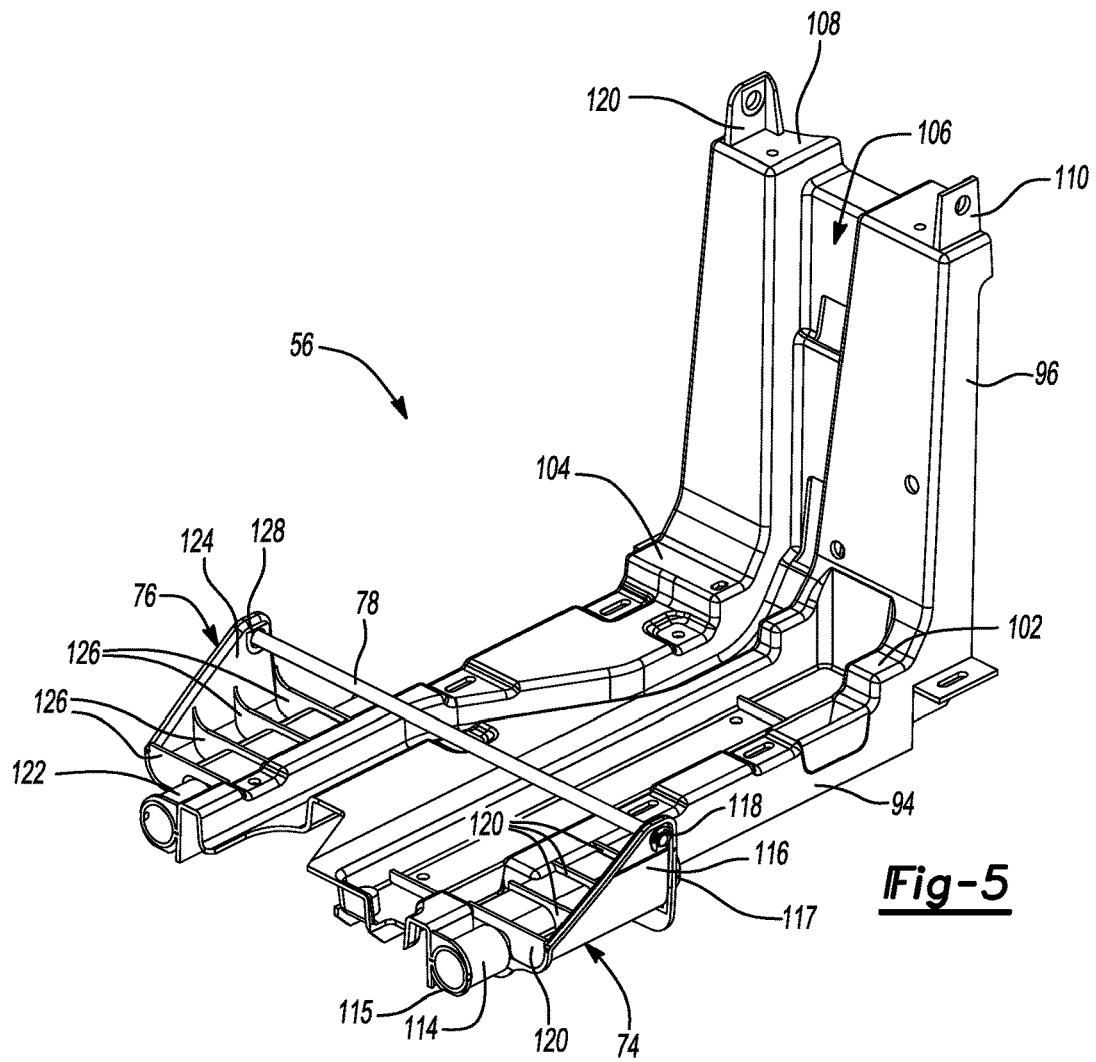
FIG. 5 is a perspective view of a cradle of the example console assembly of FIG. 1.

Referring now to FIG. 5, the cradle 56 includes the first connector wing 74 and the second connector wing 76. The first connector wing 74 and the second connector wing 76 are received over the first support bar 68 and the second support bar 70, respectively. In this manner, the cradle 56 serves as the support structure for the console 58 as will be explained. The cradle 56 includes a base 94 and a tower 96. The base 94 is positioned horizontally between the first connector wing 74 and the second connector wing 76. The base 94, in the example shown, is positioned in the same plane (i.e., the translation plane) as the center axis 98 of the first support bar 68 and the center axis 100 of the second support bar 70.

The tower 96, in the example shown, is oriented perpendicularly to the base 94. The tower 96 and the base 94 form an L-shape. At the corner of the cradle 56 in which the base 94 intersects with the tower 96, a first shoulder 102 and a second shoulder 104 project upward from the base 94. The first shoulder 102 and the second shoulder 104 can support the console 58 as will be further explained.

The tower 96 also includes a channel 106. The channel 106 extends upwardly from the base 94 toward a distal end 108 of the tower 96. The channel 106 is a recessed portion of the tower 96 through which electrical wires, cables or other conduits can be routed from the base 94 (or from other regions of the console assembly 50) upwardly into the console 58. Such electrical wires or other conduits can be routed upwardly into the console 58 to provide electrical controls, lights, power sources, connection points or other accessories inside the console 58.

The tower 96, in the example shown, also includes a first attachment arm 110 and a second attachment arm 112. The first attachment arm 110 and the second attachment arm 112 are positioned on opposite lateral sides of the distal end 108 of the tower 96. The first attachment arm 110 and the second attachment arm 112 include one or more attachment points at which the console 58 can be attached using fasteners or other connectors.

As previously described, the cradle 56 includes the first connector wing 74 and the second connector wing 76. As shown in the example of FIG. 5, the first connector wing 74 includes a sleeve 114 and an ear portion 116. The sleeve 114, is a hollow, cylindrical portion of the first connector wing 74 that is adapted to slide on the first support bar 68. To this end, the sleeve 114 has an inner diameter that is larger than an outer diameter of the first support bar 68. The sleeve 114 can include a first bushing (not shown) that is positioned in a leading end 115 and a second bushing (not shown) that is positioned in a trailing end 117 of the sleeve 114. The first support bar 68 is received through the first bushing and the second bushing to reduce the friction between the sleeve 114 and the first support bar 68. In the example shown, the first and second bushings are made of a self-lubricating nylon material. In other examples, bearings or other low friction elements can be used.

The ear portion 116, in the example shown, projects upward from the sleeve 114. The ear portion 116 is a planar member that is positioned transversely outboard of the sleeve 114. The ear portion 116 includes a rod opening 118. The rod opening 118 is spaced apart from the sleeve 114. The rod opening 118, in the example shown, is positioned above the sleeve 114.

The first connector wing 74 also includes one or more ribs 120. The ribs 120 are connected between the base 94, the sleeve 114 and the ear portion 116. The ribs 120 strengthen the cradle 56 at or near the first connector wing 74. In the example shown, the first connector wing 74 includes four ribs 120 longitudinally spaced apart from one another. In other examples the first connector wing 74 can include more or less than the four ribs 120.

As can be seen in FIG. 5, the second connector wing 76 has a similar structure as that previously described with respect to the first connector wing 74. The second connector wing 76, however, has a structure that is symmetrically opposite to that previously described. As shown, the second connector wing 76 also includes a sleeve 122, an ear portion 124 and ribs 126.

The cradle 56 also includes the cross-rod 78 that spans between the rod opening 118 on the first connector wing 74 to an opposing rod opening 128 on the second connector wing 76. The cross-rod 78, in the example shown, is a steel cylindrical length of material with an enlarged head at one end to prevent the cross-rod 78 from sliding through the rod opening 118 and/or the opposing rod opening 128. The opposite end of the cross-rod 78 can include a length of threads (not shown) or other connector to secure the cross-rod 78 in position between the first connector wing 74 and the second connector wing 76. In other examples, the cross-rod 78 can be made of a different material and/or can have a different shape. For example, the cross-rod 78 can have a square, rectangular or other cross-sectional shape. In addition, the cross-rod 78 can be retained to the first connector wing 74 and/or the second connector wing 76 by other suitable fasteners such as lock washers, star washers, push washers, cotter pins and the like.

As discussed above, the cradle 56 serves as the structural support member of the console assembly 50 and is configured to suspend the console 58 on the first support bar 68 and the second support bar 70. As such, the cradle 56 is made of a suitable material to withstand the forces that are imparted on the cradle 56 during movement of the console 58 and during use. In the example shown, the cradle 56 is die-cast of a suitable steel. Some of the elements of the cradle 56, such as the sleeves 114, 122 and/or the rod openings 118, 128 may be subsequently machined or processed to achieve desired tolerances and/or surface finishes.

Figure 6:
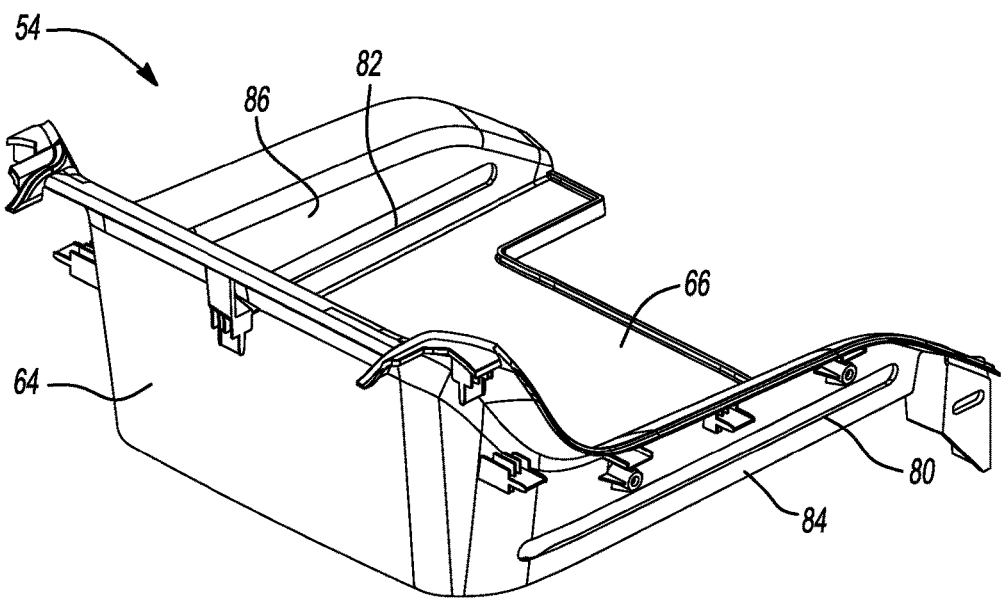
FIG. 6 is a perspective view of a floor trim tray of the example console assembly of FIG. 1.

Referring now to FIG. 6, the floor trim tray 54 includes the first side wall 84, the second side wall 86, the transverse wall 64 and the platform 66. The transverse wall 64 connects the first side wall 84 to the second side wall 86 at a leading end of the floor trim tray 54. The platform 66 connects the first side wall 84 to the second side wall 86 at a base portion of the floor trim tray 54.

The floor trim tray 54 includes the first longitudinal slot 80 and the second longitudinal slot 82. The first longitudinal slot 80 is positioned in the first side wall 84 and the second longitudinal slot 82 is positioned in the second side wall 86. The first longitudinal slot 80 and the second longitudinal slot 82 are vertically aligned in a horizontal plane that coincides with the vertical height of the cross-rod 78. When the floor trim tray 54 is assembled to the floor bracket 52, the cross-rod 78 extends from the first connector wing 74 through the first longitudinal slot 80 and through the second longitudinal slot 82 to the second connector wing 76. In this manner, the cross rod-78 spans across the platform 66. The console 58 is supported by the cross-rod 78 such that the face 62 of the console 58 is suspended above the floor trim tray 54.

The floor trim tray 54 can have smooth rounded corners as shown in FIG. 5 to create an aesthetically pleasing appearance. The platform 66 has a smooth, uninterrupted planar surface in that it is void of holes, raised projections, sharp edges and the like. As shown in the example of FIG. 5, the floor trim tray is formed as a single component. In other examples, the floor trim tray can be made of separate pieces connected together. The floor trim tray 54 can be made of any suitable material or combination of materials. In the example shown, the floor trim tray 54 is made of a suitable plastic material such as a suitable thermoplastic.

Figure 7:
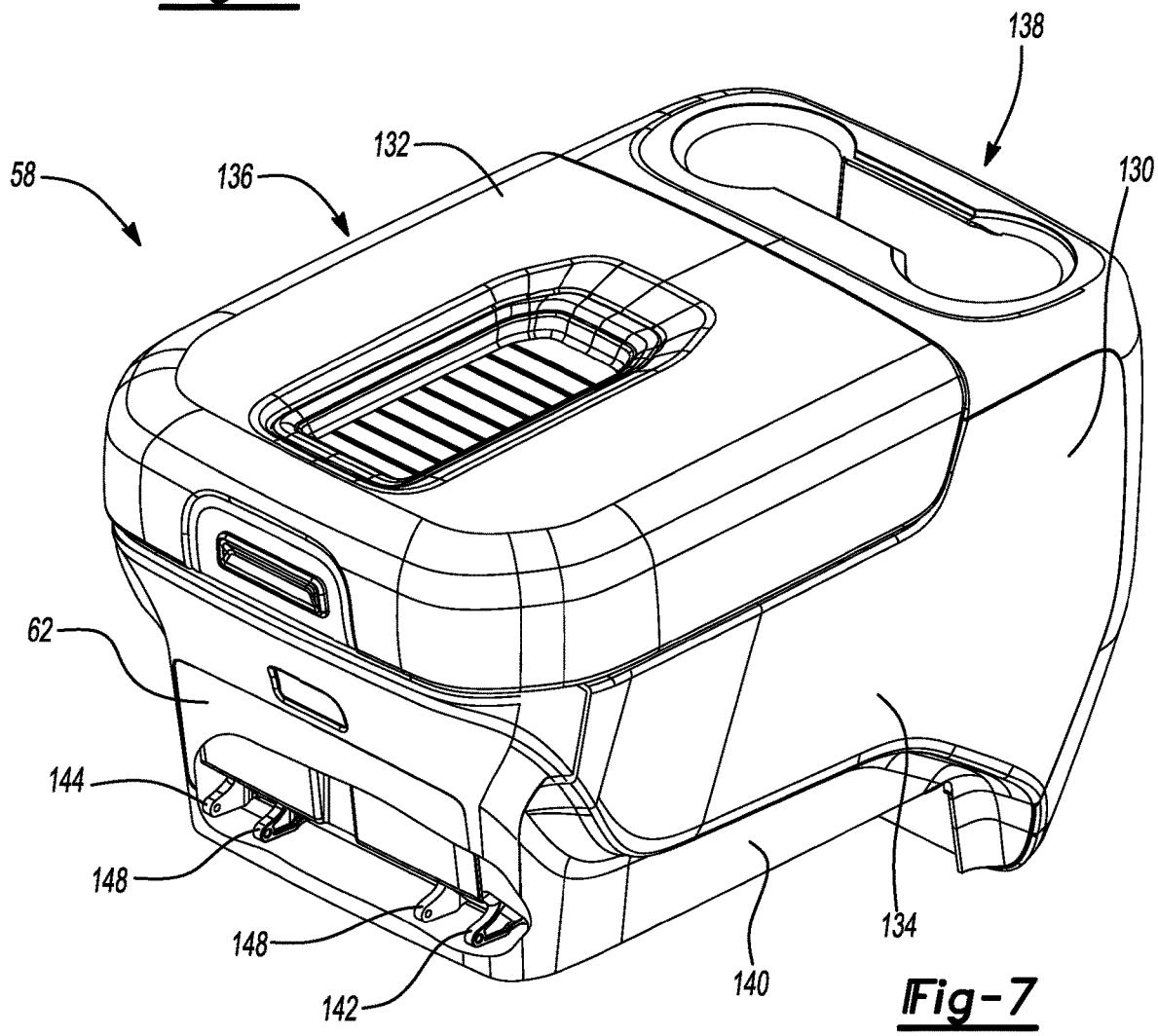
FIG. 7 is a perspective view of a console of the example console assembly of FIG. 1.

Referring now to FIG. 7, the console 58 includes a compartment 130 and an armrest 132. The compartment 130 is a generally rectangular shaped structure that includes the face 62, a first side panel 134, a second side panel 136 and a back panel 138. The face 62 and the back panel 138 are connected between the first side panel 134 and the second side panel 136 on opposite ends of the compartment 130 to define an enclosure and to provide structure to the console 58. As can be appreciated, the enclosure of the compartment 130 can be used to store items that can be placed inside the enclosure. In addition, other accessories, electrical connections, charging ports and the like can also be included inside the compartment 130.

As further shown in FIG. 7, the first side panel 134 and/or the second side panel 136, in this example, includes a contoured portion 140 that extends longitudinally along a lower region of the compartment 130. The contoured portion 140 has a rounded profile, as shown, that corresponds to a profile of the floor trim tray 54. As can be appreciated, the contoured portion 140 can nest adjacent to the floor trim tray 54 to provide a pleasing appearance when the console assembly 50 is in the covered position.

The armrest 132 is positioned on top of the compartment 130. The armrest 132 can have any suitable shape. In the example shown, the armrest 132 has a rounded rectangular shape. The armrest 132 covers the compartment 130 and can serve as a lid of the enclosure defined by the compartment 130. As such, the armrest 132 can include a hinge at a rear portion of the armrest that can permit the armrest 132 to rotate upward or away from the compartment 130 to permit an occupant to access the interior enclosure.

The console 58 is supported by the cradle 56 in the console assembly 50. At or near the back panel 138 of the compartment 130, the console 58 is connected to the tower 96 of the cradle 56. The console 58 is also supported by the first shoulder 102 and/or the second shoulder 104 of the cradle 56. The face 62 and/or forward portion of the console 58 is supported by the cross-rod 78.

A vertical height of the first shoulder 102 and/or the second shoulder 104 is sized to support the console 58 in a vertical position above the base 94. The vertical height of the cross-rod 78 above the base 94 is positioned to coordinate with the vertical height of the first shoulder 102 and/or the second shoulder 104 so that the armrest 132 of the console 58 is oriented horizontally. A floor (not shown) or the lower edges of the compartment 130 are spaced above the base 94. With this vertical spacing, the console 58 can translate over the floor trim tray 54 when it moves from the retracted position to the covered position.

The console 58 is supported on the cross-rod 78 by a first saddle mount 142, a second saddle mount 144 and two center saddle mounts 148. The first saddle mount 142, the second saddle mount 144 and the center saddle mounts 148 are connected at a lower region of the face 62 of the console 58. The first saddle mount 142, the second saddle mount 144 and the center saddle mounts 148 rest on the cross-rod 78 to support the console 58 in a suspended position above the floor trim tray 54 and the base 94 of the cradle 56.

Figure 8:
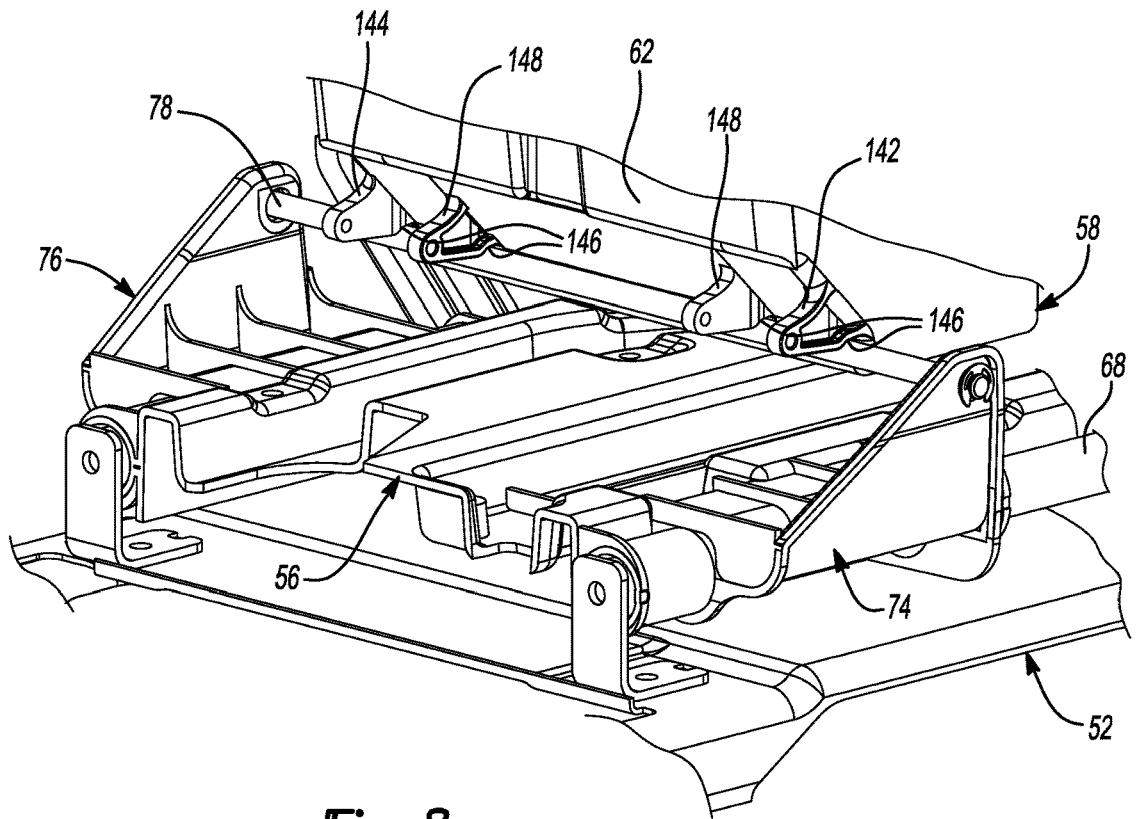
FIG. 8 is magnified perspective view of a saddle support of the console of FIG. 7.

The first saddle mount 142, the second saddle mount 144 and the center saddle mounts 148, in the example shown in FIG. 8, project downward from the face 62 of the console 58. The first saddle mount 142, the second saddle mount 144 and the center saddle mounts 148 each have a curved bridge portion 146 that has a curved shape that accepts the cross-rod 78. The curved bridge portion 146 has a curved shape with a diameter larger than the outer diameter of the cross-rod 78 so that the cross-rod 78 fits inside the bridge portion 146 without significant clearance between the bridge portion 146 and the outer surface of the cross-rod 78. In some examples, the bridge portion 146 can have a diameter that is less than the outer diameter of the cross-rod 78 such that the first saddle mount 142, the second saddle mount 144 and/or the center saddle mounts 148 can have an interference fit with the cross-rod 78.

The relative sizing between the bridge portion 146 and the cross-rod 78 permits the console 58 to be easily assembled to the cross-rod 78. When the first saddle mount 142 and the second saddle mount 144 are positioned over the cross-rod 78, the mating surfaces of the bridge portion(s) 146 and the cross-rod 78 limit longitudinal movement of the console 58 relative to the cradle 56. As can be appreciated, when the console 58 is assembled to the tower 96 and to the cross-rod 78 of the cradle 56, the console 58 moves with the cradle 56 when the cradle translates along the first support bar 68 and the second support bar 70.

Figure 9:
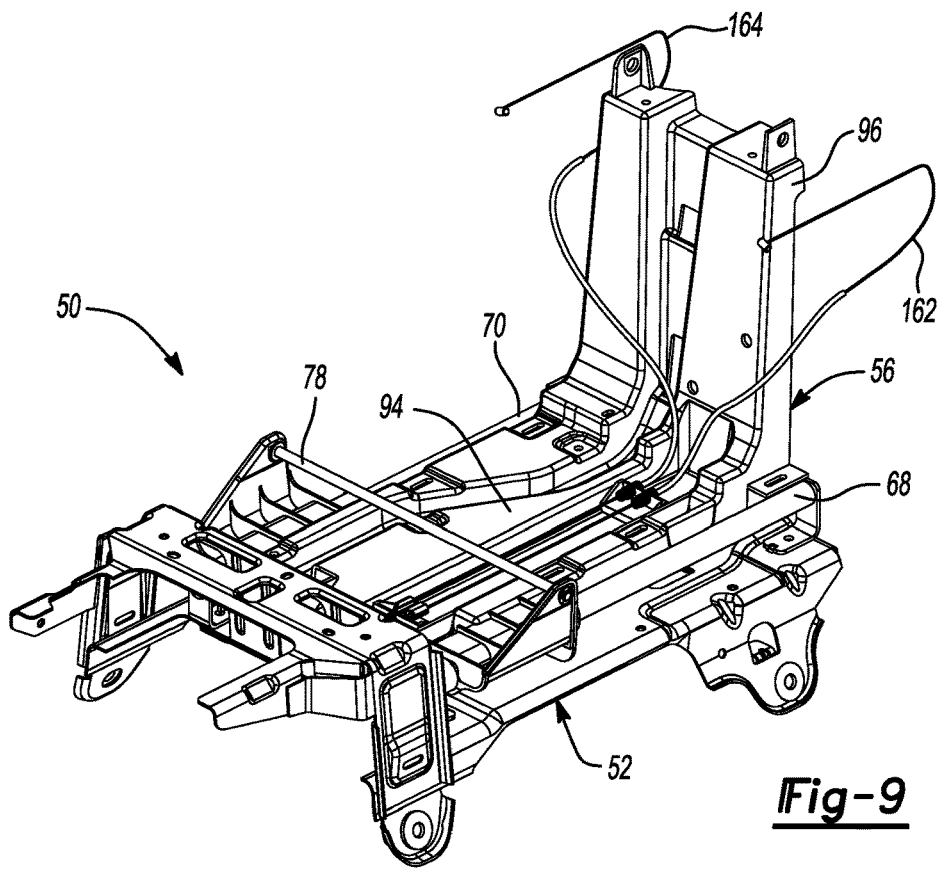
FIG. 9 is a perspective view of the example console assembly of FIG. 1 in the covered position with the armrest in the seated position shown without the console and the floor trim tray.
Figure 10:
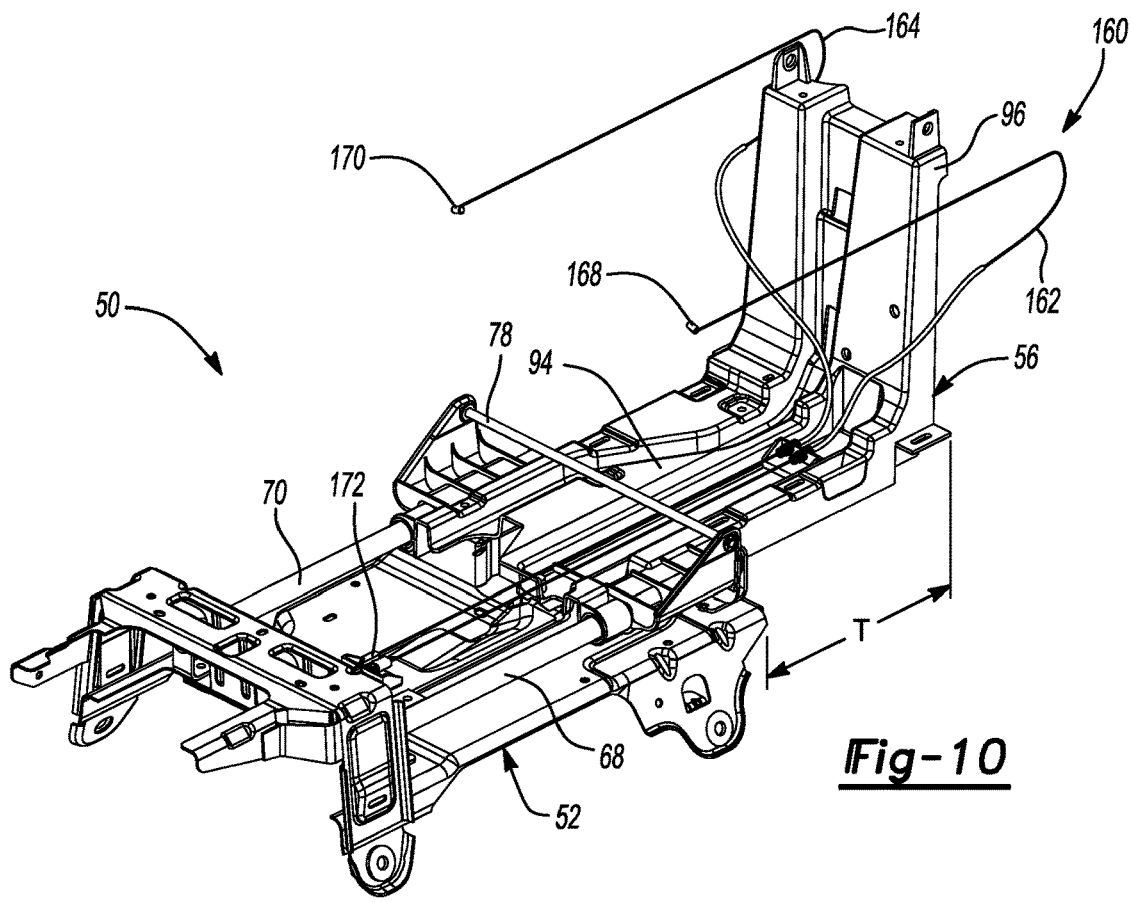
FIG. 10 is a perspective view of the example console assembly of FIG. 1 in the retracted position with the armrest in the extended position shown without the console and the floor trim tray.

The console assembly 50 is shown in FIGS. 9 and 10 without the console 58 and the floor trim tray 54 for illustrative purposes. As shown, the cross-rod 78 spans transversely across the base 94. When the cradle 56 translates longitudinally along the first support bar 68 and the second support bar 70 from the covered position (FIG. 9) to the retracted position (FIG. 10), the base 94 of the cradle 56 translates in a plane that is located vertically below the platform 66 while the cross-rod 78 translates in a plane that is located vertically above the platform 66. This permits the platform 66 to a have a smooth, uninterrupted surface. With the previously described structure, the console 58 and/or the cradle 56 does not need a track, groove, rib or other formation for support on the platform 66.

Such a smooth, uninterrupted surface on the platform 66 is desirable because the floor trim tray 54 is less susceptible to retaining dirt, crumbs, spills or other contaminants that may fall into the floor trim tray. In addition, the platform 66 with the smooth, uninterrupted surface, as described herein, is less likely to snag, scratch or otherwise interfere with a personal item (e.g., a purse, backpack or briefcase) that is deposited into the floor trim tray 54 when the console assembly 50 is in the retracted position.

In the example shown, the cradle 56 translates a translation distance T. The translation distance T, in one example, is approximately 254 mm (10 inches) when it moves from the covered position to the retracted position. This movement exposes approximately 254 mm (10 inches) of the platform 66 of the floor trim tray 54 for the storage of a personal item. In such an example, the cradle 56 (and/or the console 58) translates a translation distance T in the range of 225 mm to 275 mm. In other examples, the translation distance T can have other lengths. In another example, the cradle 56 (and/or the console 58) translates at least 127 mm (5 inches) and exposes at least 127 mm (5 inches) of the platform 66 of the floor trim tray 54. In another example, the cradle (and/or the console 58) translates at least 225 mm. In other examples, the cradle 56 (and/or the console 58) translates more than 254 mm (10 inches) or less than 127 mm (5 inches).

Figure 11:
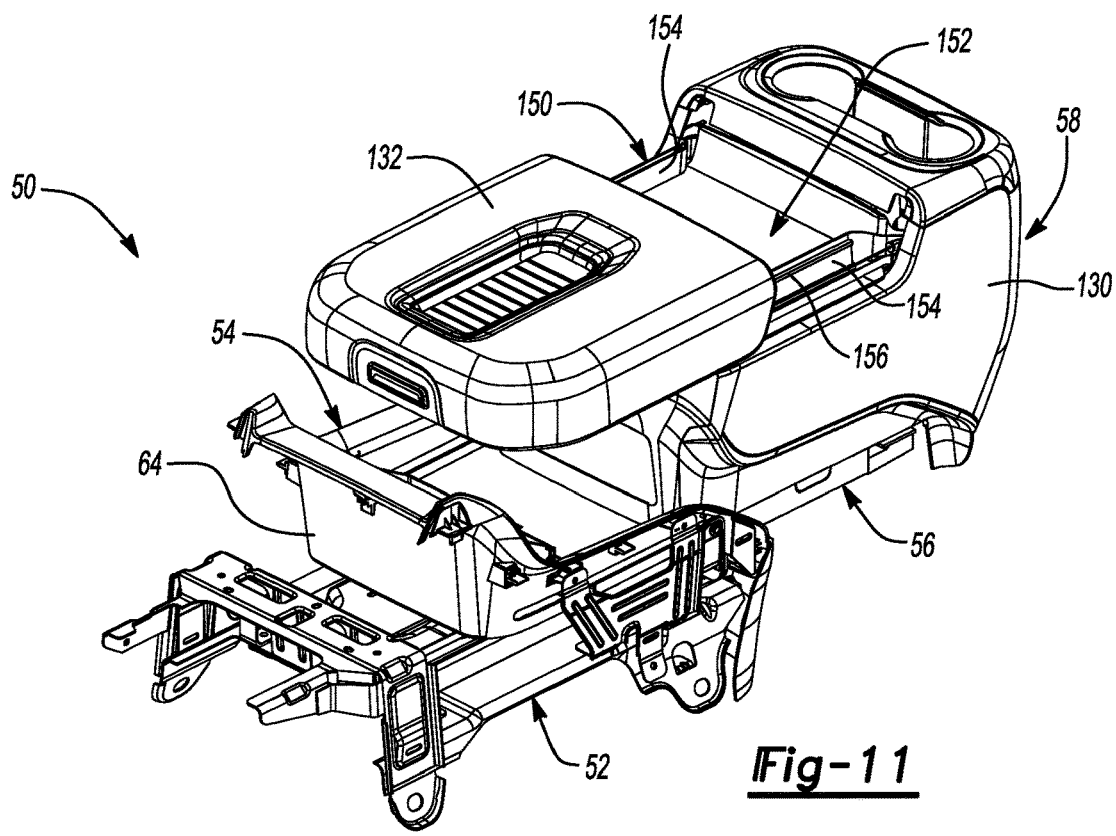
FIG. 11 is a perspective view of the example console assembly in the retracted position of FIG. 2 shown with the armrest in an extended position.

In one example of the console assembly 50, the armrest 132 of the console 58 translates between a seated position (FIG. 1) and an extended position (FIG. 11). When moving to the extended position, the armrest 132 translates away from the compartment 130 in a horizontal plane. In the example shown, the armrest 132 translates forward of the compartment 130 towards the transverse wall 64 of the floor trim tray 54. The armrest 132, in this example, translates in a direction opposite to the translation direction of the console 58 when the console 58 moves from the covered position to the retracted position.

As can be appreciated, when the console assembly 50 is located in a vehicle between a driver's seat and a passenger's seat, it can be desirable to have an armrest 132 that can move to the extended position. When the console 58 translates from the covered position to the extended position, the armrest 132 translates with the compartment 130 (see FIG. 2, for example). As such, the armrest 132 is positioned rearward in vehicle and may not be comfortably positioned adjacent an occupant's arm. When the armrest 132 is moved to the extended position (FIG. 11), the armrest 132 can be longitudinally located proximate an occupant's arm such that it can be comfortably used by the occupant.

As shown in FIG. 11, the armrest 132, when in the extended position, covers at least a portion of the floor trim tray 54. The armrest 132, however, is vertically spaced above the floor trim tray 54 to permit a personal item to be stored in the floor trim tray 54. Such functionality allows the console assembly 50 to provide the added benefit of the additional storage capacity of the floor trim tray 54 when the console 58 is in the retracted position and also positions the armrest 132 in a position for continued use by an occupant.

As further shown in FIG. 11, the armrest 132 is connected to the compartment 130 by an armrest tray 150. The armrest tray 150 can include a storage bin 152 defined by enclosure walls 154. The enclosure walls 154 are positioned on opposite longitudinal sides of the storage bin 152 can include a track 156 on which the armrest 132 can translate longitudinally. As shown, the track 156 includes a pair of parallel ribs projecting transversely outward from the longitudinal sides of the storage bin 152. The armrest 132, in this example, includes cooperating female channels. The armrest can slide along the track 156 to translate the armrest from the seated position to the extended position.

The console assembly 50, in one example, includes a return mechanism 160 that returns the armrest 132 to the seated position from the extended position when the console is moved from the retracted position to the covered position. Such a return mechanism is desirable to prevent the armrest from damaging surrounding items or components.

When the console assembly 50 is in the retracted position and the armrest 132 is in the extended position (FIG. 11), the armrest 132 has the potential to move forward of the floor trim tray 54 if the console assembly 50 is returned to the covered position while the armrest 132 is extended. An instrument panel, cup holders, storage compartments, control systems or other components and items may be located in the region forward of the floor trim tray 54. To prevent the armrest 132 from contacting and/or damaging such items, the console assembly 50, in one example, includes the return mechanism 160 to return the armrest 132 to the seated position when the console 58 moves to the covered position.

In one example, as shown in FIGS. 9 and 10, the return mechanism 160 includes a first cable 162 and a second cable 164. As shown, the first cable 162 and the second cable 164 are positioned longitudinally along the base 94 and upwards along the tower 96. The first cable 162 is then routed transversely outward with a first connecting end 168 projecting longitudinally forward of the tower 96. On a side of the tower 96 opposite to the first cable 162, the second cable 164 is routed outward with a second connecting end 170 projecting longitudinally forward of the tower 96. As can be appreciated, the first cable 162 and/or the second cable 164 can be routed within grooves or other pathways inside the console 58 between the tower 96 and the first connecting end 168 and/or the second connecting end 170. While not shown, the first connecting end 168 is connected to a first side of the armrest 132 and the second connecting end 170 is connected to a second side of the armrest 132.

In the example shown, the first cable 162 and the second cable 164 are connected to the base at a cable connector 172. The first cable 162 and/or the second cable 164 can extend forward of the cable connector 172 and be connected to a force-inducing member (not shown) such as an electric motor, spring, actuator or the like.

When the armrest 132 is moved to the extended position, the first connecting end 168 and the second connecting end 170 move outward and away from the tower 96 as shown in FIG. 12. In this position, the console 58 is in the retracted position and the armrest 132 is in the extended position as shown in FIG. 11.

When an occupant desires to move the console 58 from the retracted position to the covered position, the return mechanism 160 causes the armrest 132 to return to the seated position so that the armrest does not move forward of the floor trim tray 54 and cause damage to surrounding components or items. As the console 58 translates toward the floor trim tray 54, the first cable 162 and the second cable 164 are moved through their respective pathways such that the first connecting end 168 and the second connecting end 170 move rearward. This action, in turn, causes the first cable 162 and the second cable 164 to pull the armrest 132 to the seated position.

The first cable 162 and the second cable 164, in the example shown, are Bowden cables with a flexible cable positioned inside a hollow cable housing. As such, the first cable 162 and the second cable 164 can transmit forces between the connected ends of the cables. In other examples, the return mechanism 160 can include other elements to transmit a force to the armrest 132 to return the armrest 132 from the extended position to the seated position. Such alternative elements can include springs, actuators or other biasing components.

As described above, the console assembly 50 and the various elements thereof described herein can be used between the front seats of a vehicle. As can be appreciated, the console assembly 50 and/or the principles of the present disclosure can also be used in different orientations in a vehicle and in other locations in a vehicle such as between second or third row seats or in cargo areas of a vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A floor-mounted console assembly comprising:
   a stationary floor bracket configured to secure to a floor of a vehicle, the stationary floor bracket including a longitudinal first support bar and a longitudinal second support bar positioned parallel to the first support bar;
   a cradle including a first connector wing and a second connector wing, the first connector wing slidably received over the first support bar and the second connector wing slidably received over the second support bar; and
   a console connected to the cradle and supported by the first connector wing and the second connector wing such that the console is vertically spaced above the first support bar and the second support bar,
   wherein the console and the cradle are configured to translate along the first support bar and the second support bar from a covered position in which a platform of a floor trim tray is covered by the console to a retracted position in which at least a portion of the platform of the floor trim tray is exposed.

2. The floor-mounted console assembly of claim 1 further comprising the floor trim tray connected to the floor bracket wherein the platform of the floor trim tray is vertically positioned between a plane defined by the first and second support bars and the console.

3. The floor-mounted console assembly of claim 2 wherein the platform is positioned between a first side wall and a second side wall, and the platform has a smooth, uninterrupted surface between the first side wall and the second side wall.

4. The floor-mounted console assembly of claim 1 wherein the cradle includes a base and a tower, and the base is orthogonally connected to the tower to form an L-shape to support the console.

5. The floor-mounted console assembly of claim 4 wherein the base of the cradle is positioned between the first connector wing and the second connector wing.

6. The floor-mounted console assembly of claim 5 wherein the cradle is suspended in a translation plane above a horizontal support wall of the floor bracket by the first connector wing and the second connector wing.

7. The floor-mounted console assembly of claim 1 wherein the console translates at least 127 mm when the console moves from the covered position to the retracted position.

8. The floor-mounted console assembly of claim 1 wherein the console longitudinally translates a translation distance in a range of 225 mm to 275 mm.

9. The floor-mounted console assembly of claim 1 wherein:
the cradle includes a cross-rod that transversely extends between the first connector wing and the second connector wing; and
the console is supported by the cross-rod above the first support bar and the second support bar.

10. The floor-mounted console assembly of claim 9 wherein:
the floor trim tray includes a first side wall and a second side wall connected to longitudinal sides of the platform, the first side wall include a first longitudinal slot and the second side wall including a second longitudinal slot; and
the cross-rod extends through the first longitudinal slot and the second longitudinal slot.

11. The floor-mounted console assembly of claim 10 wherein the console includes a saddle mount with a curved bridge portion, the curved bridge portion received on the cross-rod to vertically support the console and limit longitudinal movement of the console relative to the cradle.

12. The floor-mounted console assembly of claim 1 wherein the first connector wing includes a first sleeve and a first ear portion, the first sleeve having a hollow cylindrical shape and being co-axially aligned with the first support bar such that the first sleeve slides along an outer surface of the first support bar, and the first ear portion is connected transversely outboard of the first sleeve and projects upwards therefrom.

13. The floor-mounted console assembly of claim 12 wherein:
the second connector wing includes a second sleeve and a second ear portion, the second sleeve having a hollow cylindrical shape and being co-axially aligned with the second support bar such that the second sleeve slides along an outer surface of the second support bar, the second ear portion connected transversely outboard of the second sleeve and projecting upwards therefrom; and
the console is supported above the first support bar and the second support bar by a cross-rod that extends between the first ear portion and the second ear portion.

14. The floor-mounted console assembly of claim 1 wherein the first support bar and the second support bar are connected to and vertically spaced above a horizontal support wall of the floor bracket.

15. The floor-mounted console assembly of claim 1 wherein the console includes an armrest and a compartment, the armrest positioned over the compartment in a seated position, the armrest configured to translate on a track relative to the compartment to an extended position.

16. The floor-mounted console assembly of claim 15 wherein the armrest is configured to translate forward of the compartment when the console is in the retracted position.

17. The floor-mounted console assembly of claim 16 wherein the armrest includes a return mechanism that includes a first cable and a second cable, the first cable and the second cable configured to move the armrest to the seated position when the console is moved from the retracted position to the covered position.

18. The floor-mounted console assembly of claim 17 wherein the first cable and the second cable are routed along the cradle and through the console to the armrest.

19. A floor-mounted console assembly comprising:
a floor bracket including a plurality of attachment tabs configured to secure the floor bracket to a floor of a vehicle and a pair of support bars secured to a horizontal support wall of the floor bracket in a longitudinal direction, the pair of support bars oriented parallel to one another and spaced above the support wall of the floor bracket;
a floor trim tray connected to the floor bracket, the floor trim tray including:
a horizontal platform positioned above the pair of support bars;
a first side wall connected to the horizontal platform and projecting upwards therefrom, the first side wall including a first longitudinal opening; and
a second side wall connected to the horizontal platform and projecting upwards therefrom opposite to the first side wall, the second side wall including a second longitudinal opening positioned opposite to the first longitudinal opening;
a cradle including a base, a pair of connector wings and a cross-rod, the pair of connector wings joined to the base and projecting laterally outward therefrom, the pair of connector wings received over the pair of support bars to position the base below the horizontal platform of the floor trim tray, the cross-rod secured to the pair of connector wings such that the cross-rod is supported horizontally above the horizontal platform of the floor trim tray and extends between the pair of connector wings through the first longitudinal opening and the second longitudinal opening; and
a console connected to the cradle and supported above the horizontal platform of the floor trim tray by the cross-rod such that the console is configured to translate with the cradle along the pair of support bars from a covered position in which the horizontal platform is covered by the console to a retracted position in which at least a portion of the horizontal platform is exposed.

20. The floor-mounted console assembly of claim 19 wherein the console and the cradle horizontally translate at least 127 mm when the console moves from the covered position to the retracted position.

* * * * *